United States Patent [19]
Spears et al.

[11] 3,929,541
[45] Dec. 30, 1975

[54] METHOD FOR HEATING THERMOPLASTIC ELEMENTS

[75] Inventors: Johnnie E. Spears, Titusville, Pa.; Donald L. Caldwell, Bartlesville, Okla.

[73] Assignee: Phillips Petroleum Company, Bartlesville, Okla.

[22] Filed: Apr. 29, 1974

[21] Appl. No.: 464,955

[52] U.S. Cl. ............... 156/157; 156/304; 156/306; 156/503
[51] Int. Cl.² .......................................... B29C 27/06
[58] Field of Search .......... 156/157, 158, 159, 304, 156/306, 499, 583, 502, 503; 219/243; 432/226

[56] References Cited
UNITED STATES PATENTS

| | | | |
|---|---|---|---|
| 3,013,925 | 12/1961 | Larsen | 156/503 |
| 3,729,360 | 4/1973 | McElroy | 156/158 |
| 3,810,806 | 5/1974 | Swartz | 156/306 |

*Primary Examiner*—William A. Powell
*Assistant Examiner*—Brian J. Leitten

[57] ABSTRACT

Ends of two thermoplastic elements are heated to their respective fusion temperatures wherein the fusion temperatures are different and wherein the fusion temperatures are reached at approximately the same time. A heating means having two heating surfaces and an insulating plate are employed to accomplish the heating.

6 Claims, 2 Drawing Figures

METHOD FOR HEATING THERMOPLASTIC ELEMENTS

BACKGROUND OF THE INVENTION

The invention relates to heating thermoplastic elements. In another aspect, the invention relates to joining two thermoplastic elements by fusion.

The use of thermoplastic elements, such as conduits, has risen substantially over the last several years. Thermoplastic conduits have been employed for transporting fluids of all kinds and particularly corrosive fluids.

Generally thermoplastic conduits are manufactured in specific lengths which are then joined during installation for a particular use. Various methods are employed to join thermoplastic conduits and a number of the methods make very strong joints. However, one of the more difficult problems encountered in joining thermoplastic conduits and various other thermoplastic elements in general arises when the two pieces of conduit to be joined have different fusion or melt temperatures. The problem resides primarily in heating the ends of the conduits to be joined to their respective fusion temperatures at approximately the same time.

Accordingly it is an object of the invention to heat the ends of thermoplastic elements.

Another object of the invention is to heat the ends of thermoplastic elements wherein the elements have different fusion temperatures.

Still another object of the invention is to heat the ends of thermoplastic elements wherein the elements have different fusion temperatures and wherein the fusion temperatures are reached at approximately the same time.

Further objects, aspects, and advantages of the invention will be apparent to those skilled in the art upon studying the drawing, specification, and appended claims.

SUMMARY OF THE INVENTION

According to the invention, ends of two thermoplastic elements are heated to their respective fusion temperatures wherein the fusion temperatures are different and they are reached at approximately the same time employing a single heating means and an insulating plate. The insulating plate is pressed between the end of the element having the lower fusion temperature and the heating means while the end of the element having the higher fusion temperature is pressed directly against the heating means. After the end of the element having the higher fusion temperature is heated for a time period X, the insulating plate is removed and the ends of both elements are heated simultaneously with the heating means for a period of time Y.

DETAILED DESCRIPTION OF THE INVENTION

Figures 1, 2:
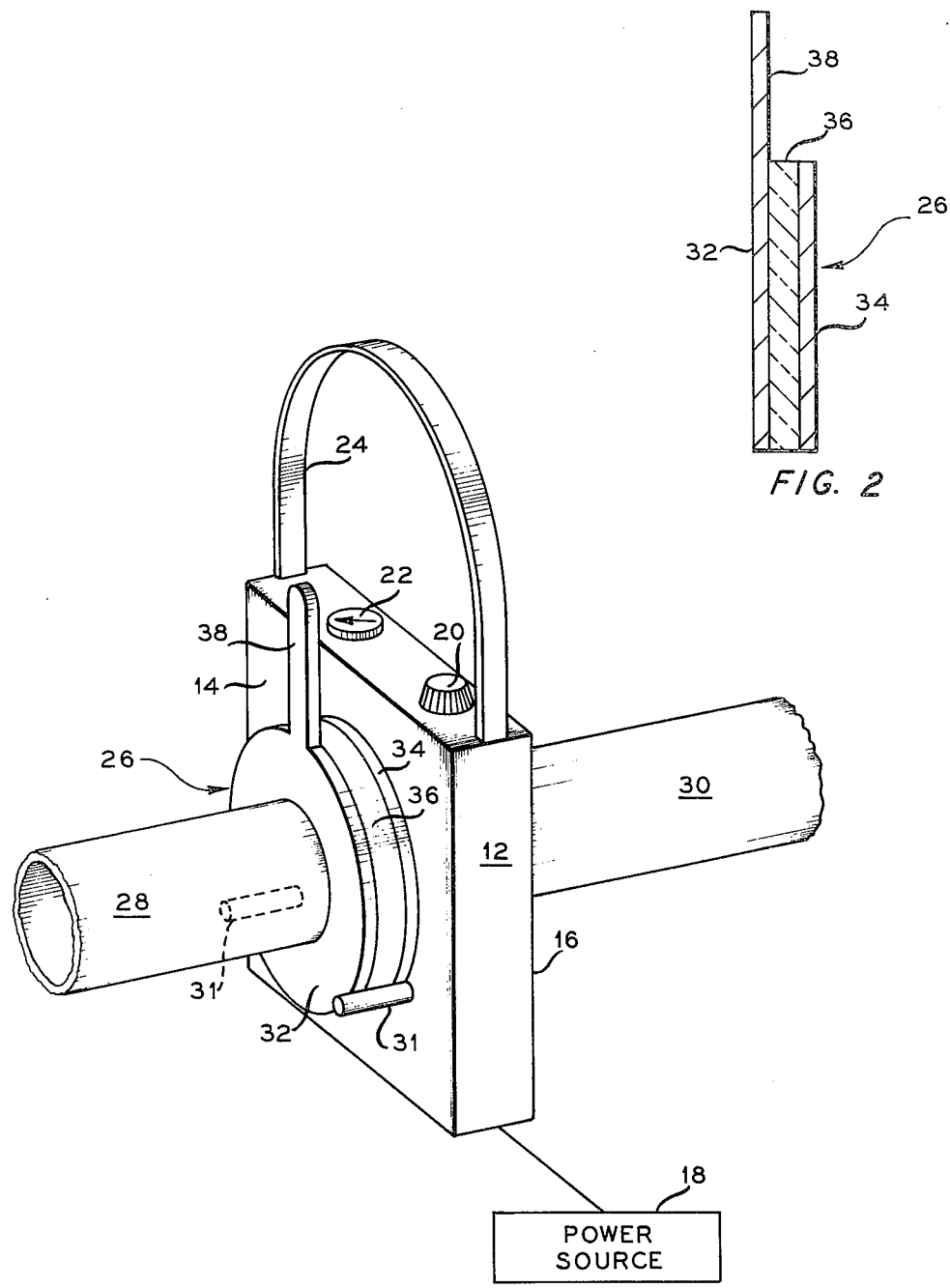

The method of this invention will be more easily understood if explained in conjunction with the attached drawings wherein FIG. 1 represents one embodiment of an apparatus useful in carrying out the method of the invention wherein the thermoplastic elements are thermoplastic conduits and FIG. 2 represents one embodiment of an insulating plate shown in FIG. 1.

Referring to FIG. 1, the apparatus useful in the method of the invention will be more fully explained. A heating means 12, such as an electric hot plate, having two heating surfaces 14, 16, is heated to a desired temperature using a suitable power source 18 and a controlling element 20. Of course the power source would be an electrical power source where the heating means is an electrical hot plate, but it is understood that other sources of power are within the scope of the invention when used in conjunction with a suitable heating means and control element. A control element 20, such as a rheostat, is used with an electrical power source. It is desirable to have some means for determining the temperature of the heating surfaces 14, 16, such as a thermometer 22. Also a handle 24 attached to heating means is useful for positioning the heating means 12. An insulating plate, indicated generally by reference numeral 26, is positioned against the heating surface 14 of heating means 12. One end of a thermoplastic conduit 28 is positioned against the insulating plate and an end of a second thermoplastic conduit 30 is positioned against the heating surface 16 of heating means 12. Pins 31 are provided for easier placement and retention of insulating plate 26. It is important that the conduit having the lower fusion temperature be positioned against the insulating plate 26 as will be further described.

Referring to both FIG. 1 and FIG. 2, insulating plate 26 comprises two pieces of a suitable outer material 32, 34, such as aluminum, and a suitable insulating material 36, such as asbestos. It is desirable to extend a portion of either piece of the outside material to provide a handle, such as the extension of outer piece 32 to make handle 38. Various other constructions and materials are suitable for insulating plate 26 with the only limitation being that the insulating plate be capable of substantially insulating the end of a thermoplastic conduit from the heat of a heating surface of a heating means when the insulating plate is positioned between the end of the conduit and the surface of the heating means.

In the method of the invention, again referring to FIG. 1, heating means 12 with insulating plate 26 resting on pins 31 and lying against heating surface 14, is pressed with light to moderate pressure between the ends of conduits 28 and 30. It may be necessary to square the ends of the conduits which are heated to insure even heat transfer. Oviously, handle 38 will be cooler if outer surface 34 is positioned against heating surface 14. The conduit with the lower fusion temperature must rest against the insulating plate as in FIG. 1, where conduit 28 has the lower fusion temperature. After the end of conduit 30 has been heated for a period of time X, the pressure between the ends of the conduits is relaxed long enough to remove the insulating plate 26, then light to moderate pressure is again applied. The end of conduit 28 which was resting against the insulating plate 26 is now in direct contact with heating surface 14 of heating means 12. Upon subsequent heating for a period of time Y, the ends of both conduits reach their respective fusion temperatures at approximately the same time.

The times X and Y depend upon the shape of the elements being heated, the type of thermoplastic materials involved, the temperature of the heating means, the material and thickness of the insulating plate, ambient temperature and numerous other variables, thus exact times cannot be specified. However, these times can be easily determined by one skilled in the art after studying the disclosure herein by simple experimentation once the variables above are known.

In general Y will represent the time required to heat the end of the conduit having the lower fusion temperature to its fusion temperature using a given heating means at a given temperature, and X plus Y will represent the time required to heat the end of the conduit having the higher fusion temperature to its fusion temperature using the same heating means at the given temperature.

Numerous thermoplastic materials are suitable for use with the present invention. Since polyethylene is one of the more common types of thermoplastic materials and thus generally available, it is one of the preferred materials which can be used. Also elements in the shape of tubing or conduits are particularly applicable for use in the present invention; however, it is obvious that almost any shape of thermoplastic element can be used with the invention, and thus the invention, in its broadest aspect, is not limited to elements of a specific shape.

EXAMPLE

As a specific example of the invention, a 2-inch schedule 40, 2½% carbon black filled, medium density polyethylene tubing having a density of 0.950 in accordance with ASTM D1505-68, a melt index of 0.20 in accordance with D1238-70, Condition E, and a melt temperature of about 235°F in accordance with D1525-70 and a 2-inch schedule 40 high density polyethylene tubing having a density of 0.955, a high load melt index of 1.5 according to ASTM D1238-70, Condition F, and a melt temperature of about 257°F were heated according to the invention. Both surfaces of an electric hot plate were heated to a temperature in the range of 375° to 400°F. An insulating plate constructed from two pieces of 18 gage aluminum sheet for the outer surfaces and one piece of ⅛ inch asbestos for the insulation was used. The size of the insulating plate was approximately equal to a heating surface of the hot plate. Both ends of the tubing were squared with a suitable facing tool and cleaned of cuttings and burrs.

The medium density polyethylene tubing was pressed against the insulating plate after the plate was positioned against one side of the hot plate. The high density polyethylene tubing was then pressed against the other side of the hot plate and heated for approximately 15 seconds. The pressure of the tubing against the hot plate was released long enough to remove the insulating plate and then the pressure was reapplied. Approximately 15 seconds later, both ends of the tubing melted at approximately the same time to produce a small bead on the top of the tubing adjacent the heating surfaces of the hot plate.

In addition, the ends of the tubing were quickly pressed together while in the melted condition and in coaxial alignment to produce an excellent joint.

Additional information with respect to joining thermoplastic conduits by fusion can be found by referring to U.S. Pat. No. 3,013,925 by O. E. Larsen, and U.S. Pat. No. 3,552,265 by C. M. Lucas.

What is claimed is:

1. A method for heating an end of a first thermoplastic element to a first fusion temperature and a second thermoplastic element to a second fusion temperature, wherein the fusion temperature of said first element is lower than the fusion temperature of the second element and wherein the fusion temperature of both elements is reached at approximately the same time, comprising the steps of:
    positioning an insulating surface adjacent a first heating surface of a heating means which has two heating surfaces to establish an insulated heating surface and a noninsulated heating surface;
    pressing the insulated heating surface against the end of the first element to be heated;
    pressing the noninsulated heating surface against the end of the second element to be heated;
    heating the end of the second element for a period of time X;
    thereafter removing the insulating surface from the first surface of the heating means;
    pressing the noninsulated first surface against the end of the first element and the noninsulated second surface against the end of the second element for a period of time Y;
    removing the noninsulated surfaces of the heating means from the ends of the elements; and
    pressing the heated ends of the elements together while said ends are at or above their respective fusion temperatures and while said ends are properly aligned.

2. The method of claim 1 wherein Y equals the heating time required to heat the end of the first element to the first fusion temperature, and wherein X + Y equals the heating time required to heat the end of the second element to the second fusion temperature.

3. The method of claim 1 wherein the elements are conduits.

4. The method of claim 3 wherein the conduits are polyethylene.

5. The method of claim 1 wherein the insulating surface consists of two outer sheets of aluminum and an inner sheet of asbestos.

6. The method of claim 1 wherein the heating means is an electrically operated hot plate.

* * * * *